(12) United States Patent
Washek

(10) Patent No.: US 6,467,551 B1
(45) Date of Patent: Oct. 22, 2002

(54) GARDEN TOOL

(76) Inventor: Robert J. Washek, 8 Cedarhill Rd., P.O. Box 179, Dover, MA (US) 02030

(*) Notice: Subject to any disclaimer, the term of this patent is extended or adjusted under 35 U.S.C. 154(b) by 0 days.

(21) Appl. No.: 09/780,189

(22) Filed: Feb. 8, 2001

(51) Int. Cl.$^7$ ................................................. A01B 1/18
(52) U.S. Cl. ..................................................... 172/378
(58) Field of Search ........................... 172/21, 25, 371, 172/378, 379; 30/303; 294/50.6–50.8

(56) References Cited

U.S. PATENT DOCUMENTS

| | | |
|---|---|---|
| 264,138 A | 9/1882 | Colvin |
| 274,108 A | 3/1883 | Connor |
| 534,199 A | 2/1895 | Clouse |
| 1,202,772 A | * 10/1916 | Baird ........................ 172/378 |
| 2,082,476 A | 6/1937 | Allen |
| 2,251,587 A | * 8/1941 | Gagner ...................... 172/378 |
| 3,061,270 A | 10/1962 | Lowe |
| 3,486,265 A | * 12/1969 | Cheesebrew ............... 294/50.6 |
| 4,286,673 A | * 9/1981 | Van Rooijen ............... 172/378 |
| 4,905,768 A | 3/1990 | Lorenz |
| RE33,702 E | * 10/1991 | Allen ....................... 56/400.12 |
| 5,207,466 A | 5/1993 | Ohlson |
| 5,435,396 A | 7/1995 | Robichaux |
| 5,441,118 A | 8/1995 | Cruz, Jr. |
| 5,706,900 A | 1/1998 | Liao |
| 5,871,058 A | 2/1999 | Naccarato et al. |
| D406,219 S | 3/1999 | Basek |
| 6,050,344 A | 4/2000 | Larson et al. |

FOREIGN PATENT DOCUMENTS

| | | | | |
|---|---|---|---|---|
| DE | 617455 | * | 8/1935 | .................. 172/378 |

* cited by examiner

Primary Examiner—Robert E. Pezzuto
(74) Attorney, Agent, or Firm—Kriegsman & Kriegsman

(57) ABSTRACT

A garden tool for rejuvenating the soil of a garden includes a tool head and a handle pivotably mounted onto the tool head. The tool head includes a central hub and a plurality of tines which are integrally formed onto the outer periphery of the hub. Each tine extends radially outward from the outer periphery of the hub and includes an arm formed onto the hub, a sharpened tooth formed onto the free end of the arm and a pair of elongated, outwardly curved wings which are formed onto the tooth. The handle is adapted to be lockably disposed of at any angle from a horizontal position to a vertical position relative to the tool head.

4 Claims, 3 Drawing Sheets

GARDEN TOOL

BACKGROUND OF THE INVENTION

The present invention relates generally to gardening and more particularly to tools used to manually move, turn, loosen, cultivate and rejuvenate the soil of a garden or landscape plot while leaving ground cover, such as bark, peat moss or mulch, which is disposed on top of the soil relatively intact.

Household recreational gardening is well known in the art and is commonly performed by individuals using manually operated gardening tools, such as shovels, hoes, claws, cultivators, rakes and pitchforks.

It is widely appreciated by gardeners that turning, loosening, cultivating and rejuvenating the soil in which seeds are planted, and in which the resulting plants grow, provides numerous advantages which results in a more productive garden.

As a first advantage, it has been found that loosening the soil of a garden enables the roots of a plant to become more firmly entrenched within the soil, which is highly desirable. Specifically, because the roots of the plant become more firmly entrenched within the soil, the roots are more capable of extracting nutrients from the soil. In addition, because the roots of the plant become more firmly entrenched within the soil, the roots are better protected from animals. Furthermore, because the roots of the plant become more firmly entrenched within the soil, the plant is more securely rooted and is less apt to be removed from the garden due to harsh weather conditions, such as high force winds.

As a second advantage, it has been found that loosening the soil of a garden allows air to more easily reach and nutrify the roots or seeds of a plant, which is highly desirable.

Accordingly, gardening tools designed specifically for turning, loosening, cultivating and rejuvenating the soil of a garden while keeping ground cover, such as bark, peat moss or mulch, which is disposed on top of the soil relatively intact are well known and are widely used in the art.

Gardening tools for loosening the soil of a garden typically comprise an elongated rod having a first end and a second end. A handle is commonly formed onto the first end of the elongated rod and is used to facilitate handling of the tool. A tool head is mounted onto the second end of the elongated rod and is used to cultivate the soil. The tool head typically includes two or more sharpened tines which are disposed to project downward from the second end of the elongated rod.

In use, gardening tools of the type described above are commonly used in the following manner to manually move, turn, loosen, cultivate and rejuvenate the soil of a garden or landscape plot while leaving ground cover, such as bark, peat moss or mulch, which is disposed on top of the soil relatively intact. Grasping the handle, the user initially disposes the tool in a generally upright position with the sharpened tines penetrating the soil. The user then typically rotates and urges down the handle of the tool in such a manner that the tines cultivate a limited circular region of the soil. Upon completion of the rejuvenation of the limited circular region of the soil, the tool is lifted vertically out of the soil and can be repositioned at another location within the garden for further cultivation.

In U.S. Pat. No. 5,706,900 to Dick Liao, there is disclosed a gardening tool for loosening soil which includes a shaft having an upper end and a lower end, a longitudinal axis, and a tine having a wavy profile along its length. The tine is connected to the bottom end of the shaft and initially projects outward from the longitudinal axis of the shaft and thereafter extends in a direction that points away from the upper end of the shaft and is substantially parallel to the longitudinal axis of the shaft. The gardening tool includes a handle having a unique design which improves ease of use.

In U.S. Pat. No. 5,207,466 to Paul W. Ohlson, there is disclosed a prong-equipped garden tool having an elongate shaft with a handle on one end of the shaft and the opposite end of the shaft having a plurality of circumferentially spaced generally axially extending cultivating and weeding prongs, the shaft and handle permitting a gardener to use the tool in a generally upright position for soil loosening, cultivating and weeding by rotary and rocking maneuvers of the handle and agitating the prongs, and for optionally spearing trash or aerating sod.

In U.S. Pat. No. 4,905,768 to F. Lorenz, there is disclosed a manual agricultural implement having a shaft with an axis and two ends, a handle arranged at one of the ends of the shaft and a tool arranged at the other end of the shaft having a plurality of tines arranged at radial distances from the shaft, the tines extending around the shaft axis in a curved manner and along the surface of an imaginary cylinder which is coaxial to the shaft axis.

Although well known and widely used in commerce, tools of the type described above suffer from notable drawbacks.

As an example, tools of the type described above typically comprise sharpened tines which have a limited surface area. As a result, the user is required to expend a considerable amount of time and energy in order to rejuvenate the soil of an entire garden, which is highly undesirable.

As another example, tools of the type described above are constructed to be used in a substantially vertical position. As a result, the user is required to constantly bend over in order to urge downward and rotate the tool, thereby creating a considerable amount of lower back strain on the user, which is highly undesirable.

As another example, tools of the type described above are constructed in such a manner so as to rejuvenate the soil of a garden at a fixed depth. As a result, the user is not able to modify the depth in which the soil is cultivated to accommodate the particular needs of the garden, which is highly undesirable.

SUMMARY OF THE INVENTION

It is an object of the present invention to provide a new and improved garden tool for manually moving, turning, loosening, cultivating and rejuvenating the soil of a garden or landscape plot.

It is another object of the present invention to provide a garden tool of the type described above which has a limited number of parts, which is easy to use and which is inexpensive to manufacture.

It is yet another object of the present invention to provide a garden tool of the type described above which is constructed to enable for the manual moving, turning, loosening, cultivating and rejuvenating the soil of a garden at varying depths.

Accordingly, as one feature of the present invention, there is provided a garden tool, comprising a tool head having a plurality of tines, each tine comprising a tooth and a first wing formed onto the tooth, and a handle mounted onto said tool head.

As another feature of the present invention, there is provided a garden tool, comprising a tool head having a plurality of tine, and a handle pivotally and lockably mounted onto said tool head.

Various other features and advantages will appear from the description to follow. In the description, reference is made to the accompanying drawings which form a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 2:
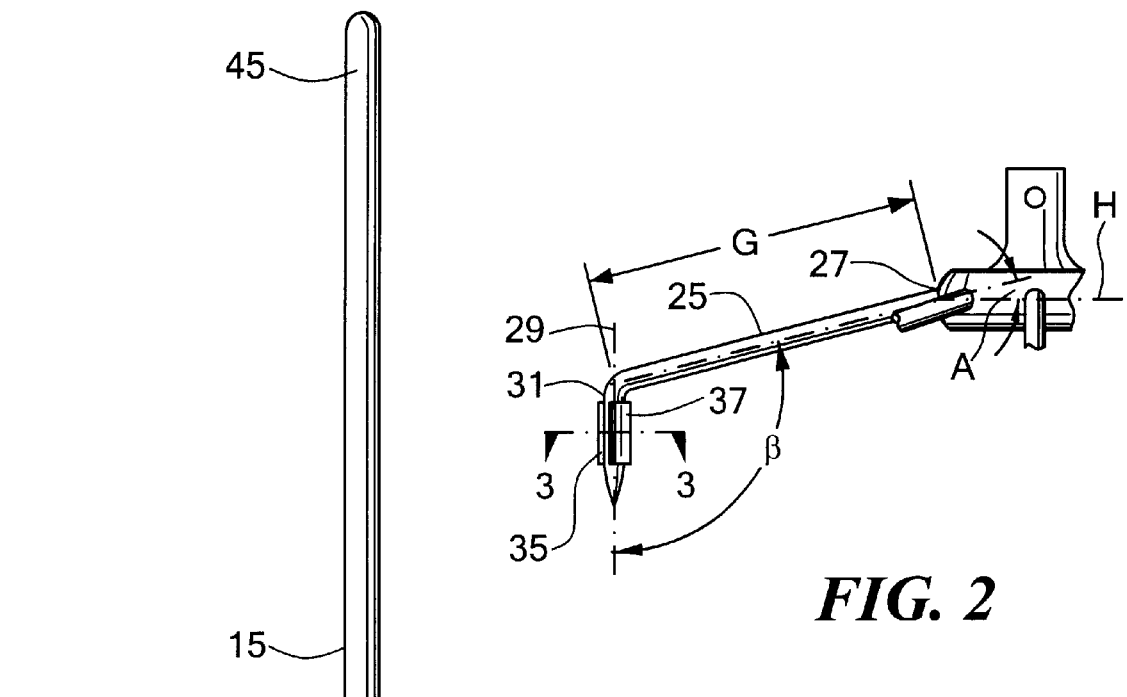
FIG. 2 is an enlarged, fragmentary side view of one of the tines and the tool head in the garden tool shown in FIG. 1.

Referring now to the drawings, there is shown a garden tool constructed according to the teachings of the present invention, the garden tool being identified generally as reference numeral 11. As will be described further in detail below, garden tool 11 is constructed for use with gardens and landscape plots. Specifically, garden tool 11 can be used to manually move, turn, loosen, cultivate and rejuvenate the soil of a garden or landscape plot while leaving ground cover, such as bark, peat moss or mulch, which is disposed on top of the soil relatively intact.

Garden tool 11 comprises a tool head 13 for manually moving, turning, loosening, cultivating and rejuvenating the soil of a garden or landscape plot and a handle 15 for facilitating movement of tool head 13, handle 15 being pivotally mounted on tool head 13 so that the angular position of handle 15 relative to tool head 13 can be adjusted.

Tool head 13 is constructed of a rigid and durable material, such as steel, and comprises a central hub 17 which comprises a top surface 19 and an outer periphery 21. Hub 17 is shown as having a generally disc-shaped configuration. However, it is to be understood that hub 17 is not limited to a disc-shaped configuration. Rather, hub 17 could be constructed into different configurations without departing from the spirit of the present invention.

A plurality of eight tines 23-1 through 23-8 are integrally formed onto outer periphery 21 of hub 17. Tines 23 protrude radially outward from periphery 21 of hub 17 in a generally star shaped configuration, as shown in FIG. 4.

Preferably, tines 23 are spaced equally along outer periphery 21 of hub 17, however, is to be understood that tines 23 could be alternatively configured without departing from the spirit of the present invention.

Although too head 13 is shown comprising eight tines 23, it is to be understood that tool head 13 could be constructed to include an alternative number of tines 23, such as for example six or twelve, without departing from the spirit of the present invention.

Figure 3:
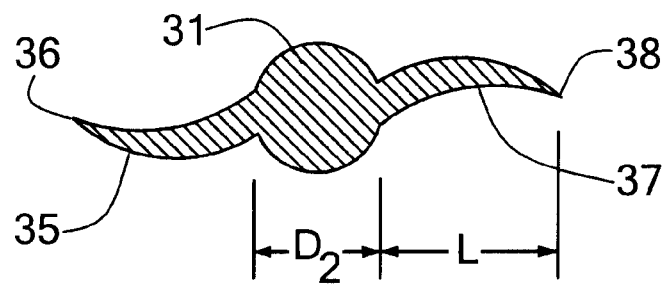
FIG. 3 is a section view taken along lines 3—3 in FIG. 2.
Figure 4:
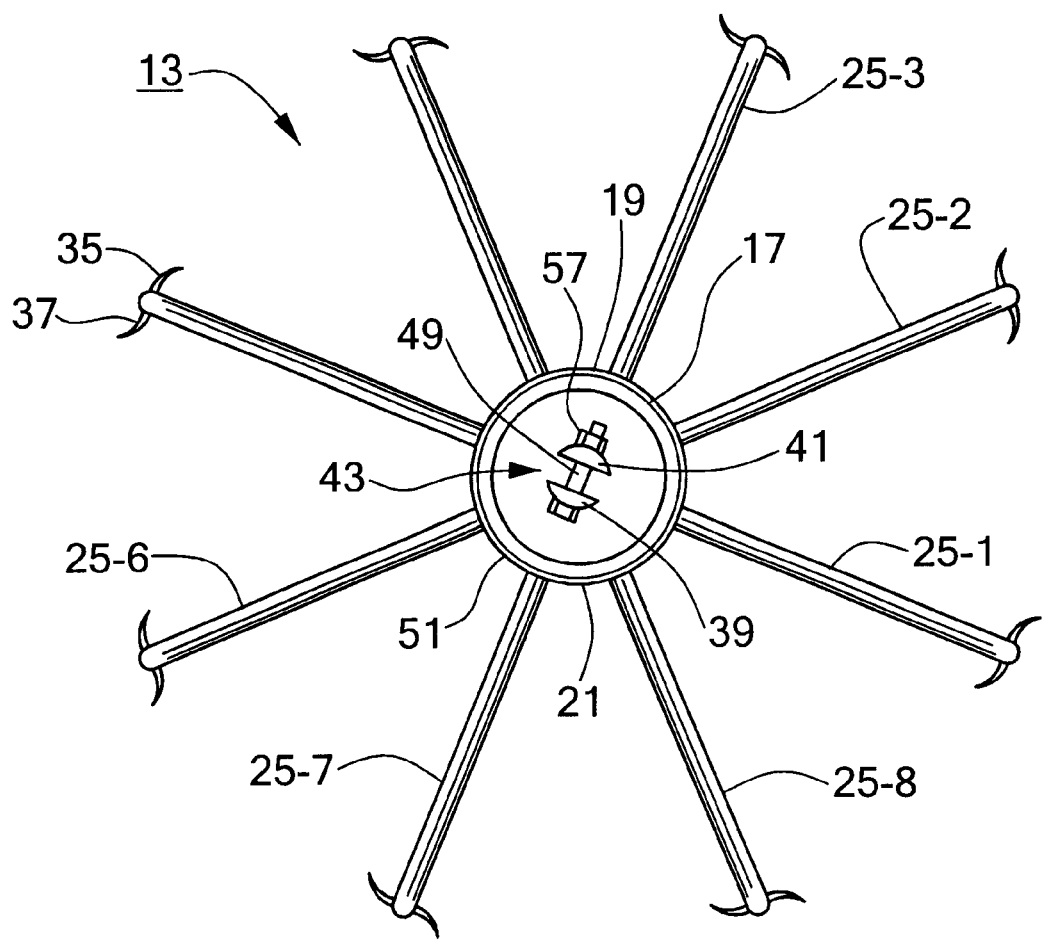
FIG. 4 is a top plan view of the tool head shown in FIG. 1.

Referring now to FIGS. 2–4, each tine 23 comprises an arm 25 which extends radially out and down from outer periphery 21 of hub 17 at an angle A relative to the horizontal axis H of hub 17 of approximately 30 degrees. In FIG. 4, arms 25 are labeled 25-1 through 25-28. Each arm 25 comprises a first or inner end 27 which is integrally formed onto outer periphery 21 of hub 17 and a second or outer end 29 and has an overall length G of about 12 inches.

An elongated tooth 31 is integrally formed onto second end 29 of shoulder 25 and is disposed to project straight down from second end 29. Tooth 31 is an elongated cylindrical member having a diameter $D_2$ of approximately 3/16 of an inch. Tooth 31 is shaped to include a sharpened tip 33. As can be appreciated, sharpened tip 33 is sized and shaped to easily penetrate the soil of a garden or landscape, which is highly desirable.

A first outwardly protruding wing, or flare, 35 is formed onto the outer periphery of each tooth 31, wing 35 having a sharpened free edge 36. Similarly, a second outwardly protruding wing, or flare, 37 is formed onto the outer periphery of each tooth 31, wing 37 having a sharpened free edge 38. As can be appreciated, wings 35 and 37 serve to increase the total surface area of tool head 13 which is in direct contact with the garden soil, thereby increasing the efficiency in which garden tool 11 cultivates the garden soil, which is highly desirable.

Wings 35 and 37 are thin, elongated members which extend nearly the entire length of each tooth 31. Specifically, wings 35 and 37 extend approximately from second end 29 of arm 25 to a point directly above sharpened tip 33.

Wings 35 and 37 are generally curved in shape so as to facilitate cultivation of the garden soil during use. As shown in FIG. 3, wings 35 and 37 are curved in opposite directions so as to maximize the efficiency in which tool 11 cultivates the garden soil, which is highly desirable. However, it is to be understood that wings 35 and 37 could be constructed in alternative shapes, such as flat, without departing from the spirit of the present invention.

Wings 35 and 37 are spaced approximately 180 degrees apart along the outer periphery of each tooth 31 so as to maximize the efficiency in which tool 11 cultivates the garden soil, which is highly desirable. However, it is to be understood that wings 35 and 37 could be alternatively spaced apart without departing from the spirit of the present invention.

Tool head 13 further comprises a pair of support members, or flanges, 39 and 41 which are integrally formed onto top surface 19 of hub 17. Specifically, support members 39 and 41 are each generally semi-circular in lateral cross-section and extend perpendicularly up from top surface 19. Support members 39 and 41 are spaced apart so as to define a handle receiving opening 43 therebetween.

Handle 15 is generally in the shape of pole which is circular in lateral cross-section and preferably constructed of a rigid and durable material, such as a hickory-birch wood.

Figure 5:
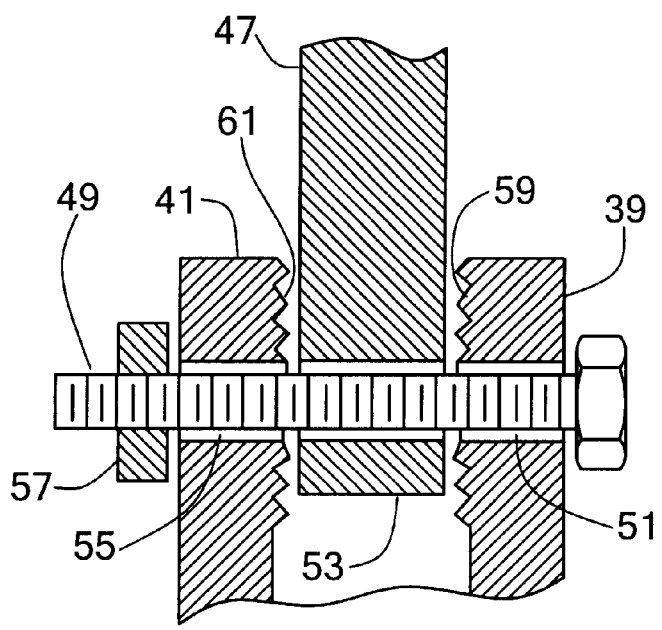
FIG. 5 is an enlarged fragmentary section view of the garden tool shown in FIG. 1.

Handle 15 comprises a first end 45 and a second end 47. Second end 47 is disposed between support members 39 and 41. A pivot device in the form of a bolt 49, extends through a hole 51 in support member 39, a hole 53 in second end 47 and a hole 55 support member 41 so as to enable handle 15 to pivot relative to tool head 13. A locking device in the form of a wingnut 51 is mounted onto bolt 49 so as to releasably lock handle 15 in a desired angular position relative to tool head 13. The inner surfaces 59 and 61 of support members 39 and 41, respectively, are preferably roughened as shown in FIG. 5 as to more securely grip lower end 47 of handle 15 when support members 39 and 41 are tightened against handle 15 by wing nut 51.

Although tool 11 is shown comprising bolt 49 and a wing nut 51 in order to pivotally and lockably mount handle 15 onto tool head 13, it is to be understood that garden tool 11 could be constructed to include alternative means for pivotally and lockably mounting handle 15 onto tool head 13 without departing from the spirit of the present invention.

Figure 1:
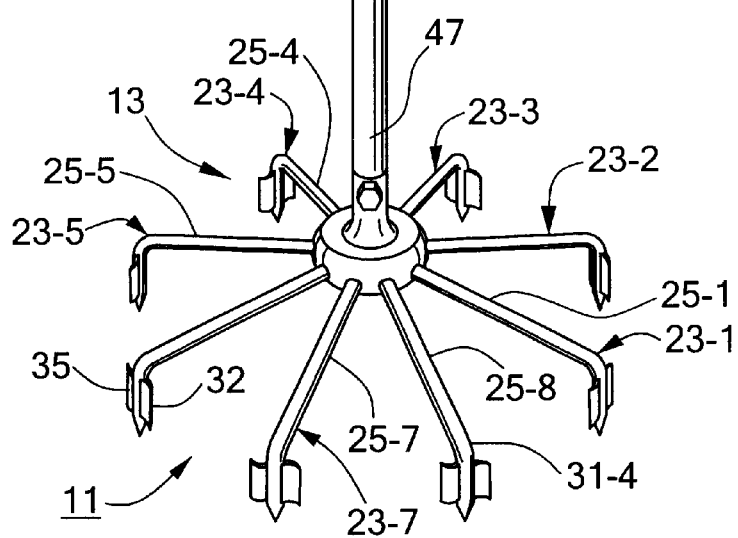
FIG. 1 is a perspective view of a garden tool constructed according to the teachings of the present invention.
Figure 6:
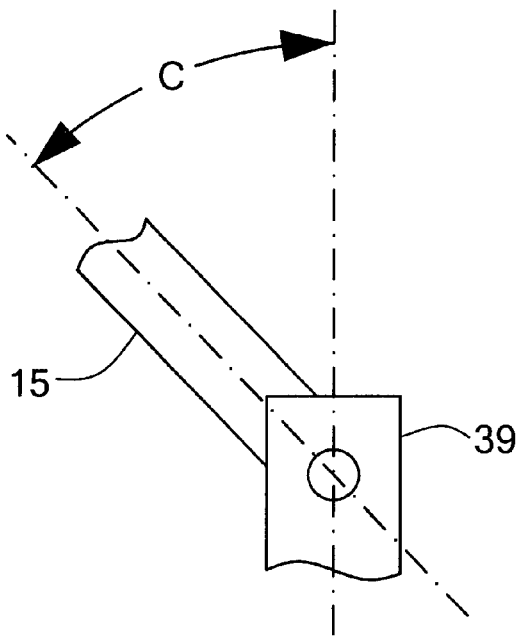
FIG. 6 is an enlarged fragmentary front view of the garden tool shown in FIG. 1 with the handle portion of the garden tool at a different angular position relative to the tool head than as shown in FIG. 1.

As can be appreciated, garden tool 11 is constructed so that handle 15 can be lockably disposed in a vertical position relative to tool head 13, as shown in FIG. 1. or at any angle C other than vertical such as for example 45 degrees from the vertical as shown in FIG. 6.

It should be noted that, because handle 15 can be pivoted relative to tool head 13, the user can selectively dispose handle 15 at a position which places the least amount of strain on the lower back of the user during use, which is highly desirable.

It should also be noted that, because handle 15 can be pivoted relative to tool head 13, the user can modify the depth in which garden tool 11 cultivates the garden soil. Specifically, if the user laterally urges garden tool 11 with handle 15 disposed in its near vertical position, tool head 13 penetrates deeply within the garden soil, thereby cultivating the soil at considerable depth. To the contrary, if the user adjusts garden tool 11 so that handle 15 is disposed in a near horizontal position, tool head 13 penetrates shallowly within the garden soil, thereby cultivating the soil at a limited depth.

In use, garden tool 11 can be used in the following manner to manually move, turn, loosen, cultivate and rejuvenate the soil of a garden or landscape plot while leaving ground cover, such as bark, peat moss or mulch, which is disposed on top of the soil relatively intact. Specifically, the user loosens locking device 51 and pivots handle 15 relative to tool head 13. Once handle 15 is disposed at its desired position, locking device 51 is tightened, thereby locking handle 15 at its desired position relative to tool head 13.

With handle 15 disposed at its desired position, tool 11 is disposed onto the garden such that tips 33 of tines 23 penetrate the garden soil. Grasping first end 45 of handle 15, the user laterally urges, or slides, garden tool 11 along the portion of the garden soil which requires loosening. Together, teeth 31 and wings 35 and 37 of each tine 23 serve to loosen the garden soil as tool 11 is laterally disposed.

As noted above, the user is capable of repositioning handle 15 relative to tool head 13 in order to change the depth in which tool head 13 loosens the garden soil and/or to decrease the strain placed on the lower back of the user, which is highly desirable.

It should be noted that, due to its particular construction, tool 11 is capable of being laterally pushed and pulled by the user to cultivate the garden soil. To the contrary, prior art cultivation devices typically require that the tool be lifted, dropped onto the portion of the garden requiring cultivation and rotationally displaced to loosen the soil. Because it can be laterally displaced, tool 11 is considerably easier to use and can operate more efficiently to cultivate a garden than comparable prior art tools, which is highly desirable.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A garden tool, comprising:

(a) a tool head, and (b) a handle pivotally mounted on said tool head, (c) said tool head comprising a hub and plurality of tines, said plurality of tines being spaced equally around the hub and extending radially outward from the hub, each tine comprising:

(i) an arm having a first end and a second end, the first end being integrally formed on the hub, the arm extending downward from the hub at an angle of about 30 degrees, (ii) a tooth integrally formed on the second end of the arm and extending straight down therefrom, said tooth being an elongated cylindrical member and having a sharpened tip, and (iii) a pair of wings formed on each tooth.

2. The garden tool of claim 1 and further comprising a locking device for locking the handle at a desired angular position relative to the tool head.

3. The garden tool of claim 2 and where said wings on each tooth are generally curved in shape and oriented in opposite directions, are about 180 degrees apart and extend nearly the entire length of each tooth.

4. The garden tool of claim 3 wherein said plurality of tines comprises eight tines.

\* \* \* \* \*